(12) United States Patent
Chen et al.

(10) Patent No.: US 6,522,882 B1
(45) Date of Patent: Feb. 18, 2003

(54) METHOD AND APPARATUS FOR LOCATING A MOBILE TRANSCEIVER IN CONVERSATION STATE

(75) Inventors: Xixian Chen, Nepean (CA); Yiu Ming Lam, Nepean (CA); Mikhail Royz, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/335,715

(22) Filed: Jun. 18, 1999

(51) Int. Cl.⁷ .................................................. H04Q 7/20
(52) U.S. Cl. ........................ 455/439; 455/456; 455/404
(58) Field of Search ................................ 455/404, 456, 455/457, 436, 439

(56) References Cited

U.S. PATENT DOCUMENTS

| | | | |
|---|---|---|---|
| 5,797,093 A | * | 8/1998 | Houde |
| 5,894,591 A | * | 4/1999 | Tamayo |
| 6,038,438 A | * | 3/2000 | Beeson et al. |
| 6,163,696 A | * | 12/2000 | Bi et al. |
| 6,240,284 B1 | * | 5/2001 | Bugnon et al. |

OTHER PUBLICATIONS

Federal Communications Commission, "Revision of the Commission's Rules To Ensure Compatibility with Enhanced 911 Emergency Calling Systems" CC Docket No. 94–102, Jul. 12, 1996.

"Time Alignment", IS–136.2 and IS–136.2 Addendum, pp. 79–82 and 331, May 17, 1995.

* cited by examiner

*Primary Examiner*—Nguyen T. Vo
*Assistant Examiner*—Nghi H. Ly

(57) ABSTRACT

A method and apparatus for locating, in relation to a plurality of cell sites, a mobile cellular transceiver in a conversation state. The method includes the steps of transmitting from one of the plurality of cell sites to the mobile transceiver a handoff signal for causing the mobile transceiver to continually transmit a known beacon signal while still in the conversation state, at at least some of the plurality of base stations, receiving the known beacon signal and measuring the time at which the known beacon signal was received, and calculating the location of the mobile transceiver from the respective locations of each of the at least some of the plurality of cell sites and the respective times at which the beacon signal was received at each of the at least some of the plurality of cell sites.

43 Claims, 15 Drawing Sheets

METHOD AND APPARATUS FOR LOCATING A MOBILE TRANSCEIVER IN CONVERSATION STATE

BACKGROUND OF THE INVENTION

1. Field of the Invention

The present invention relates to a method and apparatus for locating a mobile transceiver operating in its conversation state. More particularly, the invention is directed to causing a mobile transceiver, while in conversation state, to transmit to a plurality of cell sites a predetermined beacon signal as a time difference of arrival reference datum.

2. Description of Related Art

It is desirable that wireless telecommunications service providers be able to geographically locate a mobile wireless transceiver in emergency situations. For example, a kidnap victim might be tracked via his mobile transceiver, including a cellular or PCS telephone. In fact, the United States Federal Communication Commission has mandated under Docket No. CC94-102 that wireless telecommunications service providers be able to locate a mobile transceiver within 125 m with a 67% degree of confidence as of Oct. 1, 2001. This ability is colloquially referred to as enhanced 911 ("E911") service.

E911 service can be implemented from either the mobile transceiver perspective or the network perspective. From the mobile transceiver perspective, one might combine a global positioning system ("GPS") receiver with a wireless mobile transceiver, such that the combination might periodically or on command report its geographic location to a proximate cell site. This solution has a number of disadvantages, including that the mobile transceiver becomes heavy, bulky, power hungry, and complicated compared to a conventional wireless transceiver.

From the network perspective, the problem is approached by realizing that a mobile transceiver in communication with one cell site is generally also detectable by other proximate cell sites. Thus, one can determine the geographic location of the mobile transceiver with reference to the geographic location of each of the cell sites detecting the mobile transceiver and the relative times at which each of these cell sites respectively receives a particular signal from the mobile transceiver. This network approach implements a time difference of arrival (TDOA) calculation.

In estimating at each cell site the time of arrival of a signal from the mobile transceiver, one conventionally detects both the beginning of the mobile transceiver signal and the signal's phase difference, or intra-symbol time delay. In this regard, it is advantageous that the cell sites know in advance the specific signal to be transmitted by the mobile transceiver.

For example, in a system compliant with interim standard IS-136, this predetermined signal can be obtained from the shortened burst that a mobile transceiver transmits when it initiates a call. This arrangement is satisfactory so long as the mobile transceiver is in a state from which it can initiate a call. For reference, the shortened burst is specified in interim standard IS-136.2.

However, it is also desirable that the mobile transceiver be able to summon help to its location while its user is engaged in an ongoing call, i.e. while the mobile transceiver is in a conversation state. For example, a mobile transceiver user might be speaking with a friend when he detects a need to summon emergency personnel to his location, in which case it might be unsafe or traumatic to terminate the conversation and then dial 911 to determine location.

Unfortunately, current solutions do not support generating a known beacon signal, for example a shortened burst, while a wireless transceiver is in the conversation state.

SUMMARY OF THE INVENTION

Aspects of the invention are directed to locating a mobile transceiver in the conversation state. They provide for deliberately forcing the mobile transceiver into a handoff process, wherein without leaving the conversation state, the mobile transceiver transmits a predetermined beacon signal for example a shortened burst—to be received at proximate cell sites. Conventionally, this handoff process is initiated when poor signal quality indicates a need to determine which of the cell sites can best communicate with the mobile transceiver in its current location. However, according to aspects of the invention, this handoff process can also be used to generate a time difference of arrival dataset from the relative times at which the beacon signal respectively arrives at each proximate cell site.

More particularly, according to a preferred embodiment of the invention, the user initiates the locating process by transmitting a flash 911 ("*911") signal from the mobile transceiver to the cell site with which it is currently in communication, requesting that the wireless communication network determine the geographic location of the mobile transceiver.

In response, the cell site receiving the *911 signal transmits to the mobile transceiver a handoff signal, including a synchronization signal. Thereafter, the mobile transceiver synchronizes to the synchronization signal and begins continually transmitting a predetermined beacon signal, for example a shortened burst.

Cell sites sufficiently proximate to the mobile transceiver receive the predetermined beacon signal and with reference to a time standard, ascertain the time of arrival of the beacon signal at that cell site. Each such cell site communicates to a mobile telephone switching office the time at which it received the predetermined beacon signal and, in the event that the mobile telephone switching has not previously stored the cell site's geographic location, the cell site's geographic location.

Upon receiving from such cell sites a sufficient dataset of location and time of arrival data, the mobile telephone switching office performs time difference of arrival calculations and thereby resolves the location of the mobile transceiver.

In another embodiment of the invention, another node on the mobile telephone system may initiate the locating process, either with or without the locating process being detectable at the mobile transceiver. In the case of a detectable locating process initiated for example by a friend or a family member, the mobile transceiver may prompt the user before transmitting the beacon signal to determine whether or not the user wants to be located. In the case of an undetectable locating process, advantageous for law enforcement applications, the mobile transceiver would transmit the beacon signal without prompting the user and without leaving the conversation state.

In yet another embodiment of the invention, the mobile transceiver may initiate the locating process for other than emergency purposes. Thus, the mobile telephone network may provide additional services to mobile transceiver users, such that when a user dials a predetermined code or number the mobile transceiver transmits a subscription service signal to the mobile telephone network, which responds by transmitting to the mobile transceiver location data in either visual or audible form.

Thus, more precisely, there is provided according to one aspect of the invention a method including the steps of: transmit ting from one of a plurality of cell sites to a mobile transceiver a handoff signal for causing the mobile transceiver to continually transmit a predetermined beacon signal without leaving a conversation state; at at least some of the plurality of cell sites, receiving the predetermined beacon signal and measuring the time at which the beacon signal was received; and calculating the location of the mobile transceiver from the respective locations of each of the at least some of the plurality of cell sites and the respective times at which the beacon signal was received at each of the at least some of the plurality of cell sites.

The handoff signal might be a signal to the mobile transceiver to handoff to a large diameter cell, might be a Fast Associated Control Channel Handoff (FACCH) signal, and might include a synchronization signal.

It is desirable that the method further include transmitting from one of the plurality of cell sites to the mobile transceiver a cancel signal for causing the mobile transceiver to stop transmitting the predetermined beacon signal and to resume normal conversation.

The cancel signal might include a physical layer control signal, which might in turn include a time alignment signal.

Preferably, calculating the location of the mobile transceiver includes calculating at a mobile telephone switching office the location of the mobile transceiver. In such case, the method might further include receiving at the mobile telephone switching office a query signal and transmitting the handoff signal from one of the plurality of cell sites in response to receiving at the mobile telephone switching office the query signal.

Receiving at the mobile telephone switching office a query signal might advantageously include receiving at the mobile telephone switching office a query signal from the mobile transceiver, including a *911 signal.

According to another aspect of the invention, there is provided a system, including: a mobile telephone switching office having a processor and memory storing codes for instructing the processor to calculate a location of a mobile transceiver based upon the respective locations of a plurality of receivers and the respective times that a beacon signal was received at each of the plurality of receivers; and a plurality of cell sites in communication with the mobile telephone switching office, at least some of the plurality of cell sites having: a transmitter for transmitting to the mobile transceiver a handoff signal for causing the mobile transceiver to continually transmit a predetermined beacon signal without leaving a conversation state; a receiver for receiving from the mobile transceiver the predetermined beacon signal continually transmitted from the mobile transceiver; a clock for measuring the time at which the predetermined beacon signal was received at the receiver; and a communication channel for communicating to the mobile telephone switching office the time at which the predetermined beacon signal was received at the receiver.

According to yet another aspect of the invention, there is provided a method including: receiving at a mobile transceiver from one of a plurality of cell sites a handoff signal for causing the mobile transceiver to continually transmit a predetermined beacon signal without leaving a conversation state; and transmitting to at least some of the plurality of cell sites, the predetermined beacon signal for time difference of arrival calculation.

According to still another aspect of the invention, there is provided a cellular mobile transceiver apparatus locatable in a conversation state with respect to a plurality of cell sites, having: a receiver for receiving from at least one of the plurality of cell sites a handoff signal for causing the mobile transceiver to continually transmit a predetermined beacon signal while still in the conversation state; and a transmitter for transmitting the predetermined beacon signal to at least some of the plurality of cell sites for time difference of arrival calculation in response to the handoff signal being received at the receiver.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Description of Preferred Embodiments

Figure 1:
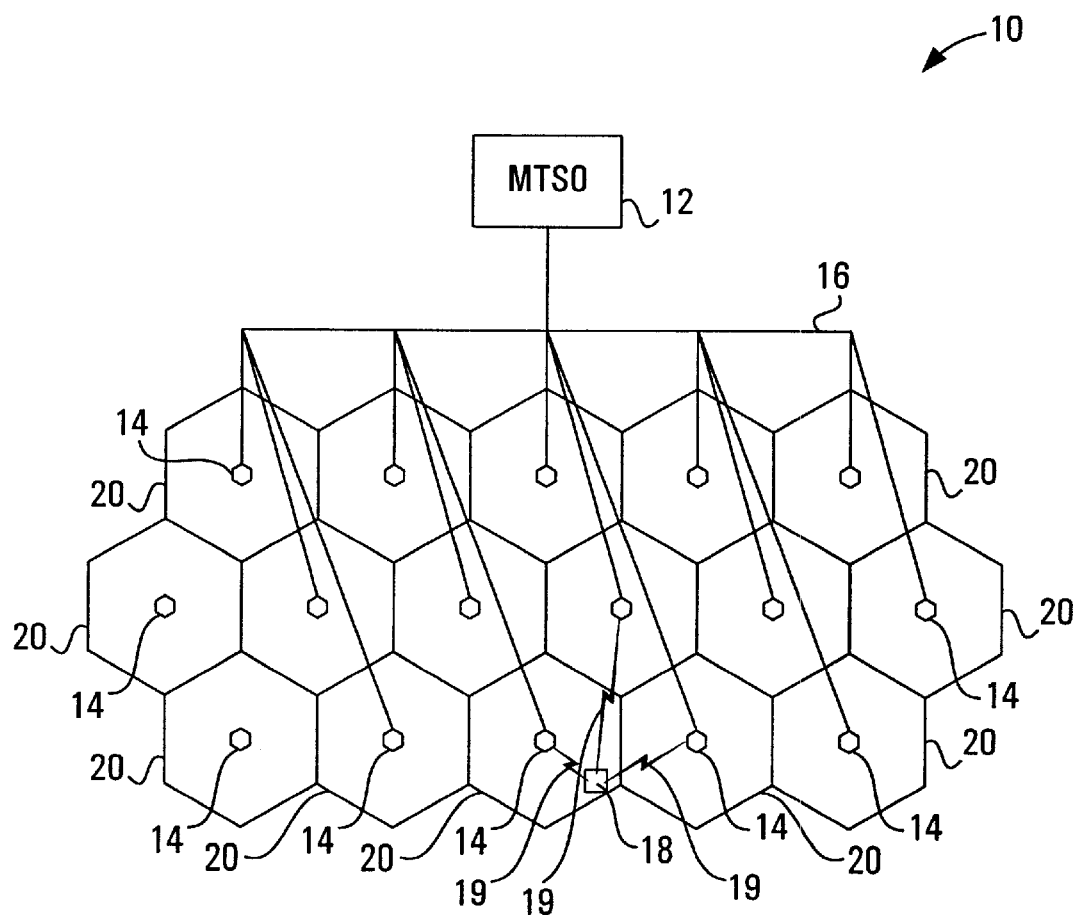
FIG. 1 is an overview block diagram of a mobile telephone system, including a mobile telephone switching office, a plurality of cell sites, and at least one mobile transceiver.

FIG. 1 illustrates a mobile telephone system generally indicated at 10. The mobile telephone system 10 includes a mobile telephone switching office ("MTSO") 12 in communication with a plurality of cell sites 14 over a trunk 16. The mobile telephone system 10 further includes at least one mobile transceiver 18 bidirectionally connectable to one or more of the plurality of cell sites 14 by a radio link 19.

Each of the plurality of cell sites 14 defines a cell 20 within which the mobile transceiver 18 is likely to be in communication with that one of the plurality of cell sites 14. Nevertheless, when the mobile transceiver 18 is outside of the cell 20 defined by any of the plurality of cell sites 14, such cell sites 14 might still detect or even be in communication with the mobile transceiver 18.

Thus, it will be seen that a mobile transceiver 18 located within a particular cell 20 and in communication with one of the plurality of cell sites 14 may transmit a signal receivable at more than one of the plurality of cell sites 14. For clarity of explanation, this embodiment is being described in terms of a plurality of cell sites 14. However, a broader contemplated embodiment would extend to a plurality of cell site partitions or sectors. In this sense, the term cell site 14 should be understood to mean and include cell site partition on cell site sector.

It will be appreciated that this network configuration supports time difference of arrival calculations to determine the location of the mobile transceiver 18 relative to proximate cell sites 14. In particular, the configuration is well suited for supporting a method for locating the mobile transceiver 18 in a conversation state, where one of the plurality of cell sites 14 transmits to the mobile transceiver 18 a handoff signal for causing the transceiver to continually transmit a predetermined beacon signal, for example a shortened burst, without leaving the conversation state; at at least some of the plurality of cell sites 14, receiving the predetermined beacon signal and measuring the time at which the beacon signal was received; and calculating the location of the mobile transceiver 18 from the respective location of each of the receiving plurality of cell sites 14 and the respective times at which the beacon signal was received at each of the receiving plurality of cell sites 14. Preferably, this calculation step is carried out at the mobile telephone switching office 12, being the common and controlling node of the mbbile telephone system 10.

The embodiments that follow are described in significant detail for purposes of illustration, but it must be borne in mind that the invention itself is significantly broader as is set out in the claims.

Figure 2:
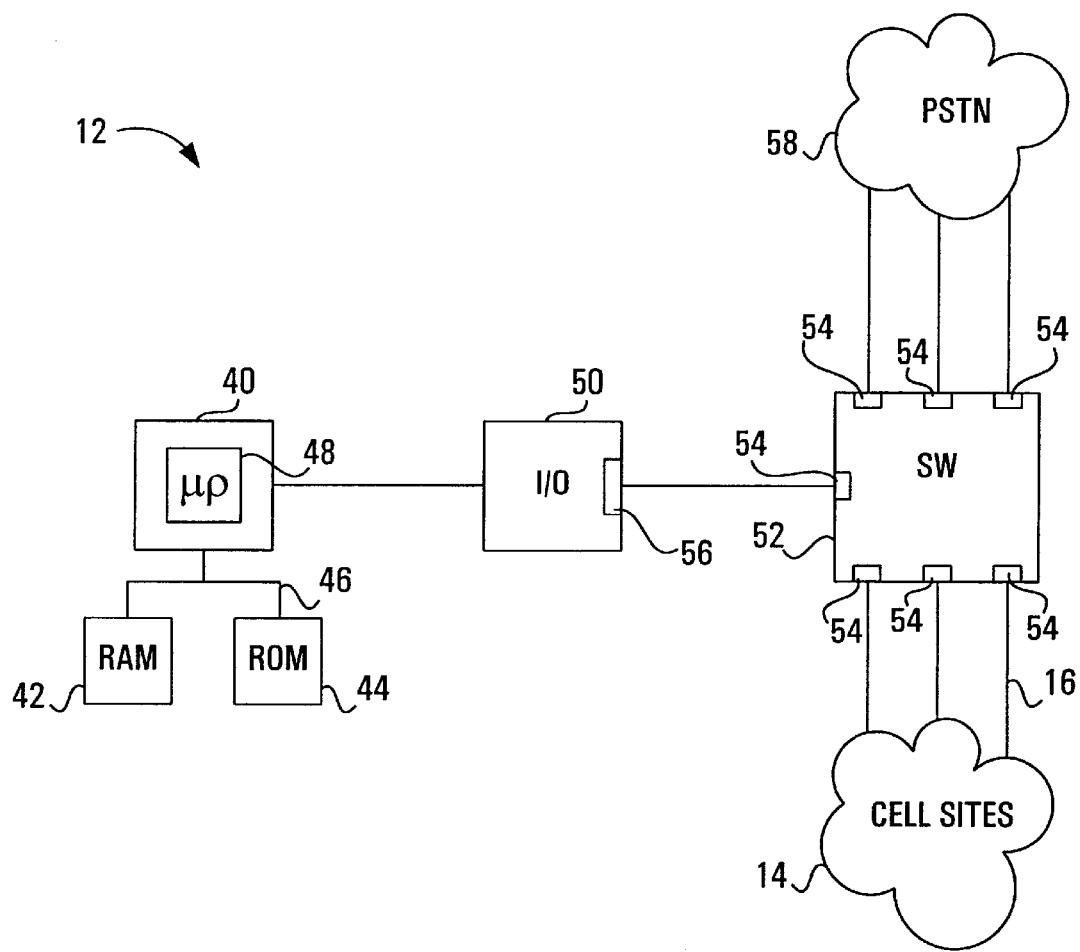
FIG. 2 is a block diagram detailing the architecture of the mobile telephone switching office (MTSO), including an MTSO microprocessor, an MTSO random access memory (MTSO RAM) and a MTSO read only memory (MTSO ROM).

FIG. 2 illustrates the architecture of the MTSO 12. The MTSO 12; includes a microprocessor circuit ("MTSO microprocessor circuit"), generally illustrated at 40. The MTSO microprocessor circuit 40 is in communication with memory devices, including random access memory ("MTSO RAM") 42 and read only memory ("MTSO ROM") 44. Conventional address, data and control signal lines forming an MTSO local bus 46 are used by the MTSO microprocessor circuit 40 to read from each of the memory devices and to write to the MTSO RAM 42.

In this embodiment, the MTSO microprocessor circuit 40 includes a microprocessor 48 ("MTSO microprocessor") and various other conventional microprocessor circuit components including signal buffers, timers, and the like as will be appreciated by those skilled in the art, rendering the MTSO microprocessor 48 operable to communicate with the MTSO RAM 42 and the MTSO ROM 44. Generally, the MTSO microprocessor circuit 40 establishes an address space with the MTSO RAM 42 and the MTSO ROM 44 mapped to respective areas of the address space.

The MTSO microprocessor circuit 40 is in communication with a plurality of interface components through an MTSO input/output ("I/O") module 50, including a communication switch 52.

The communication switch 52 includes a plurality of contacts 54 which may be connected together in various combinations at various times to conduct various communication channels through the fabric of the communication switch 52.

The MTSO microprocessor circuit 40 includes a plurality of interface circuits, some of which may be located on the MTSO microprocessor 48 and some of which may be remote from the MTSO microprocessor 48, including on the MTSO I/O module 50. These interface circuits establish a plurality of I/O ports within a designated address space through which communications between the MTSO microprocessor circuit 48 and the various interface components described above are conducted. Such communications are conducted by writing to or reading from ports associated with a given interface circuit or component described above.

In this embodiment, the interface circuits include a communication switch port 56, in bidirectional communication with the communication switch 52.

The communication switch 52 is in communication with the plurality of cell sites 14 through the trunk 16, which connects to some of the plurality of contacts 54. Similarly, the communication switch 52 is in communication with a public switch telephone network 58 via some of the plurality of contacts 54.

Figure 3:
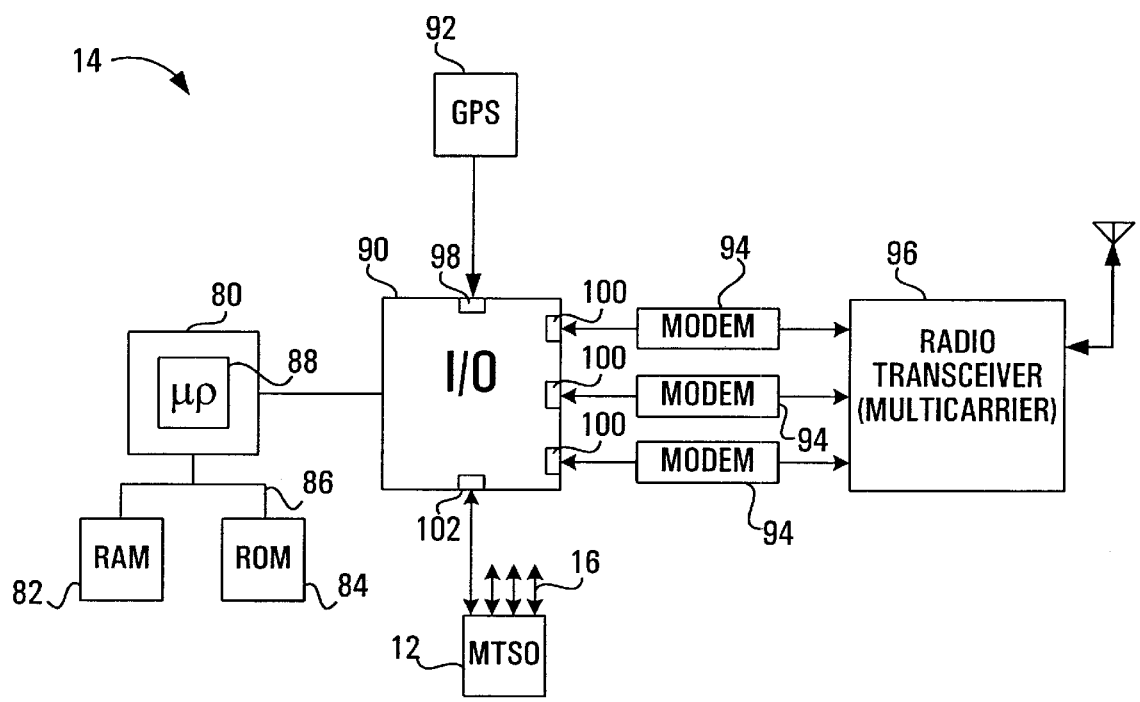
FIG. 3 is a block diagram detailing the architecture of a cell site, including a cell microprocessor, a cell site random access memory (cell site RAM) and a cell site read only memory (cell site ROM).

FIG. 3 illustrates the architecture of one of the plurality of cell sites 14 in greater detail. The cell site 14 includes a microprocessor circuit ("cell microprocessor"), generally illustrated at 80. The cell microprocessor circuit 80 is in communication with memory devices, including random access memory ("cell RAM") 82 and read only memory ("cell ROM") 84. Conventional address, data and control signal lines forming a cell local bus 86 are used, by the cell microprocessor circuit 80 to read from each of the memory devices and to write to the cell RAM 82.

In this embodiment, the cell microprocessor circuit 80 includes a microprocessor 88 ("cell microprocessor") and various other conventional microprocessor circuit components, including signal buffers, timers, and the like as will be appreciated by those skilled in the art, rendering the cell microprocessor 88 operable to communicate with the cell RAM 82 and the cell ROM 84. Generally, the cell microprocessor circuit 80 establishes an address space with the cell RAM 82 and the cell ROM 84 mapped to respective areas of the address space.

The cell microprocessor circuit 80 is in communication with a plurality of interface components through a cell input/output ("I/O") module 90, including a global positioning system ("GPS") receiver 92, a plurality of modems 94, and a section of the trunk 16 connecting the cell site 14 to the MTSO 12.

The GPS receiver 92 is connected by a radio link (not illustrated) to a plurality of geosynchronous satellites and, in response to signals received form the plurality of geosynchronous satellites, generates signals representing the current time and geographic coordinates at the location of the GPS receiver 92.

The plurality of modems 94 are in communication with a multi-carrier radio transceiver 96. The radio transceiver 96 receives a plurality of radio frequency signals respectively modulated onto a plurality of carriers and provides such plurality of signals to respective ones of the plurality of modems 94. Similarly, the radio transceiver 96 receives a plurality of signals from respective ones of the plurality of modems 94 and modulates those signals into respective ones of the plurality of carriers.

The cell microprocessor circuit 80 includes a plurality of interface circuits, some of which may be located on the cell microprocessor 88 and some of which may be remote from the cell microprocessor 88, including on the cell I/O module 90. These interface circuits establish a plurality of I/O ports within a designated address space through which communications between the cell microprocessor circuit 80 and the various interface components described above are conducted. Such communications are conducted by writing to or reading from ports associated with a given interface circuit or component described above.

In this embodiment, the interface circuits include a GPS port 98 in communication with the GPS receiver 92, a plurality of modem ports 100 in respective bidirectional communication with the plurality of modems 94, and a trunk port 102 in communication with the trunk 16.

Figure 4:
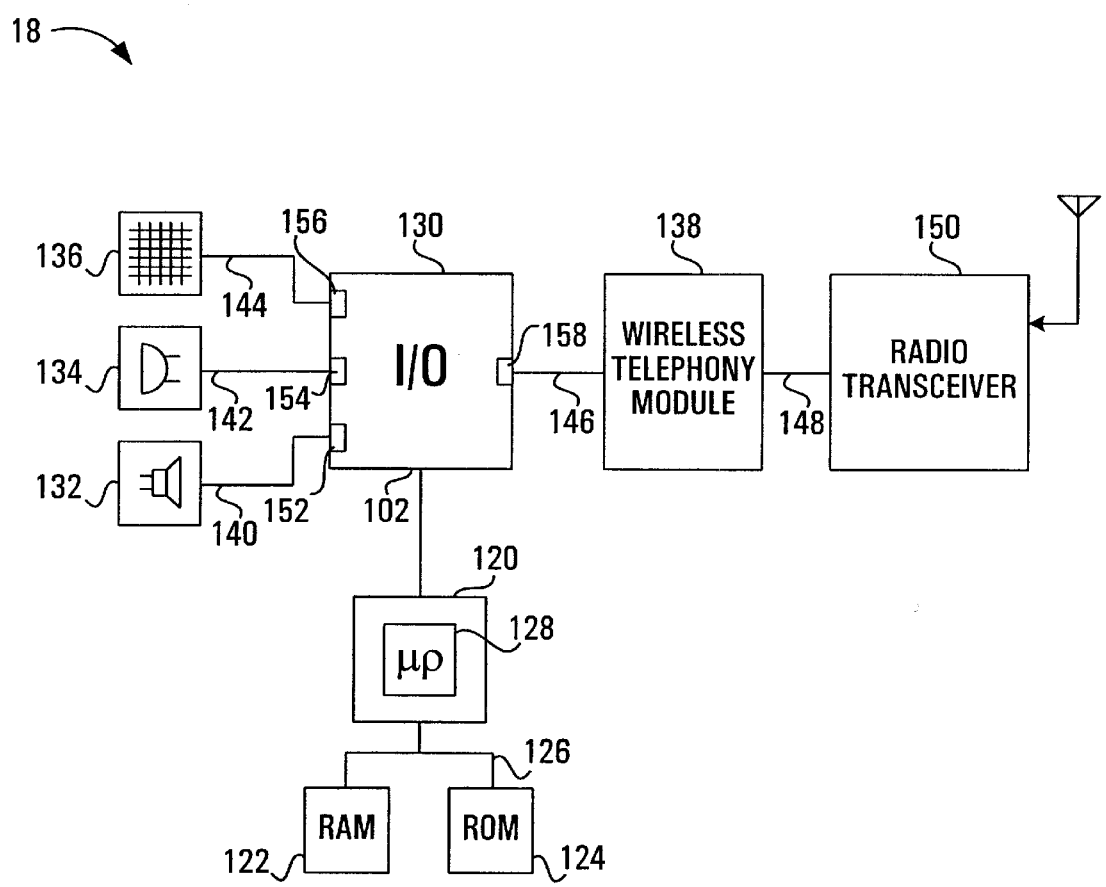
FIG. 4 is a block diagram detailing the architecture of a mobile transceiver, including a mobile microprocessor, a mobile transceiver random access memory (mobile RAM) and a mobile transceiver read only memory (mobile ROM)

FIG. 4 illustrates in greater detail the architecture of the mobile transceiver 18. The mobile transceiver 18 includes a microprocessor circuit ("mobile microprocessor circuit") generally illustrated at 120. The mobile microprocessor circuit 120 is in communication with memory devices including random access memory ("mobile RAM") 122 and read only memory ("mobile ROM") 124. Conventional address data and control signal lines forming a mobile local bus 126 are used by the mobile microprocessor circuit 120 to read from each of the memory devices and to write to the mobile RAM 122.

In this embodiment, the mobile microprocessor circuit 120 includes a microprocessor ("mobile microprocessor") 128 and various other conventional microprocessor circuit components, including signal buffers, timers, and the like as will be appreciated by those skilled in the art, rendering the mobile microprocessor 128 operable to communicate with the mobile RAM 122 and the mobile ROM 124. Generally, the mobile microprocessor circuit 120 establishes an address space with the mobile RAM 122 and the mobile ROM 124 mapped to respective areas of the address space.

The mobile microprocessor circuit 120 is in communication with a plurality of interface components through a mobile input/output (I/O) module 130, including an audio speaker 132, a microphone 134, a keypad 136, and a wireless telephony module 138.

The audio speaker 132 has a speaker input 140. The audio speaker 132 generates audio waves in response to electrical signals received at the speaker input 140.

The microphone 134 has a microphone output 142. The microphone 134 generates electrical signals at the microphone output 142 in response to audio waves arriving at the microphone 134.

The keypad 136 has a keypad output 144. In response to predetermined keypress actions at the keypad 136, predetermined electrical signals are generated at the keypad output 144.

The wireless telephony module 138 has a circuit-side terminal 146 connected to the mobile I/O module 130 and a line-side terminal 148 connected to a radio transceiver 150. The wireless telephony module 138 and the radio transceiver 150 are conventional. Radio frequency signals received at the radio transceiver 150 are down converted to provide a baseband analog signal to the wireless telephony module 138 at its line-side terminal 148. The baseband analog signal is decoded at the wireless telephony module 138 and routed to the audio speaker 132 or the mobile microprocessor circuit 120 via the mobile I/O module 130. Similarly, voice signals from the microphone 134 and command signals from the keypad 136 and the mobile microprocessor circuit 120 are provided to the wireless telephony module 138 via the mobile I/O module 130. These voice and command signals are converted into baseband analog signals at the wireless telephony module 138 and passed to the radio transceiver 150 via the wireless telephony module line-side terminal 148 for modulation onto a radio frequency carrier.

The mobile microprocessor circuit 120 includes a plurality of interface circuits, some of which may be located on the mobile microprocessor 128 and some of which may be remote, from the mobile microprocessor 128, including on the mobile I/O module 130. These interface circuits establish a plurality of I/O ports within a designated address space through which communications between the mobile microprocessor circuit 120 and the various interface components described above are conducted. Such communications are conducted by writing to or reading from ports associated with a given interface circuit or component described above.

In this embodiment, the interface circuits include a speaker port 152 in communication with the audio speaker 132, a microphone port 154 in communication with the microphone 134, a keypad port 156 in communication with the keypad 136, and a wireless telephony module port 158 in communication with the wireless telephony module 138.

Figure 5:
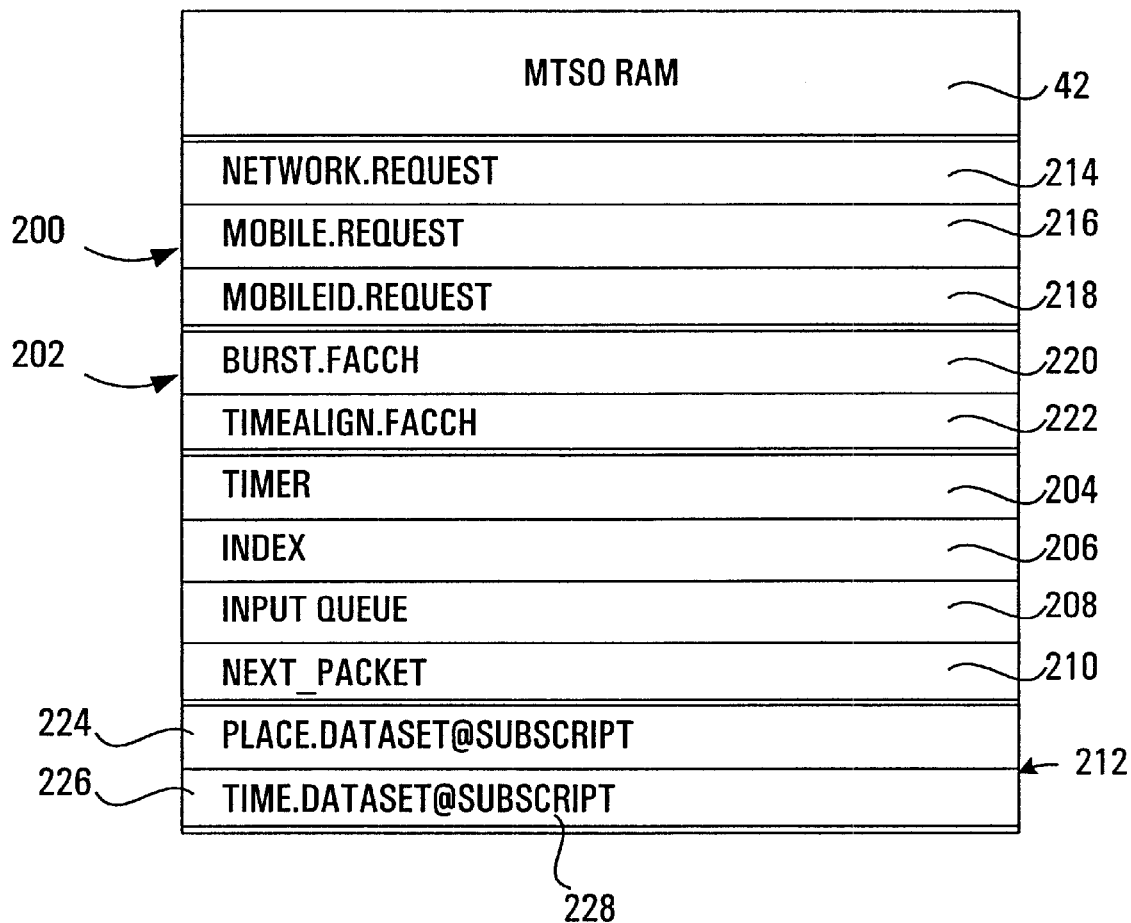
FIG. 5 is a table detailing the allocation of the MTSO RAM of FIG. 2.

FIG. 5 illustrates in greater detail the allocation of the MTSO RAM 42. The MTSO RAM includes a request array 200, a fast associated control channel handoff ("FACCH") array 202, a timer buffer 204, an index buffer 206, an input queue 208, a next_packet buffer 210 and a dataset array 212. For reference, fast associated control channel handoff !signals are specified in interim standard IS-136, part 2.

The request array 200 includes a network.request element 214, a mobile.request element 216 and a mobileID.request element 218. The network.request element 214 is loaded with codes representing an active or inactive digital state to indicate whether there exists a request on the network to locate a mobile transceiver 18. The mobile.request element 216 is loaded with codes representing a digital active or inactive state to indicate whether a mobile transceiver has requested that it be located. The mobileID.request element 218 is loaded with codes representing a predetermined unique identifier respectively associated with each mobile transceiver 18.

The FACCH array 202 includes a burst.FACCH element 220 and a timealign.FACCH element 222. The burst.FACCH element 220 is loaded with codes representing a digital active or inactive state to indicate whether the MTSO is commanding a mobile transceiver 18 to transmit a shortened burst signal. The timealign.FACCH element 222 is loaded with codes representing an allocated time slot in a time division multiple access scheme.

The timer buffer 204 is loaded with codes representing a time.

The index buffer 206 is loaded with codes representing an integer number.

The input queue 208 is loaded with codes representing an input data stream received at the MTSO I/O module 50 from the communication switch 52. The input queue 208 is associated with a read pointer and a write pointer (not illustrated) for respectively pointing to the location in the input queue 208 at which the next data is to be read or written.

The next_packet buffer 210 is loaded with codes representing a data packet read from the input queue 208 at the location indicated by the read pointer.

The dataset array 212 includes a place.dataset element 224 and a time.dataset element 226. The dataset array 212 can store multiple sets of the place.dataset element 224 and the time.dataset element 226, as referenced by an integer subscript 228. The place.dataset element 224 is loaded with codes representing geographic coordinates in a format corresponding to that used in a global positioning satellite system. The time.dataset element 226 is loaded with codes representing a time in a format corresponding to that used in a global positioning satellite system.

Figure 6:
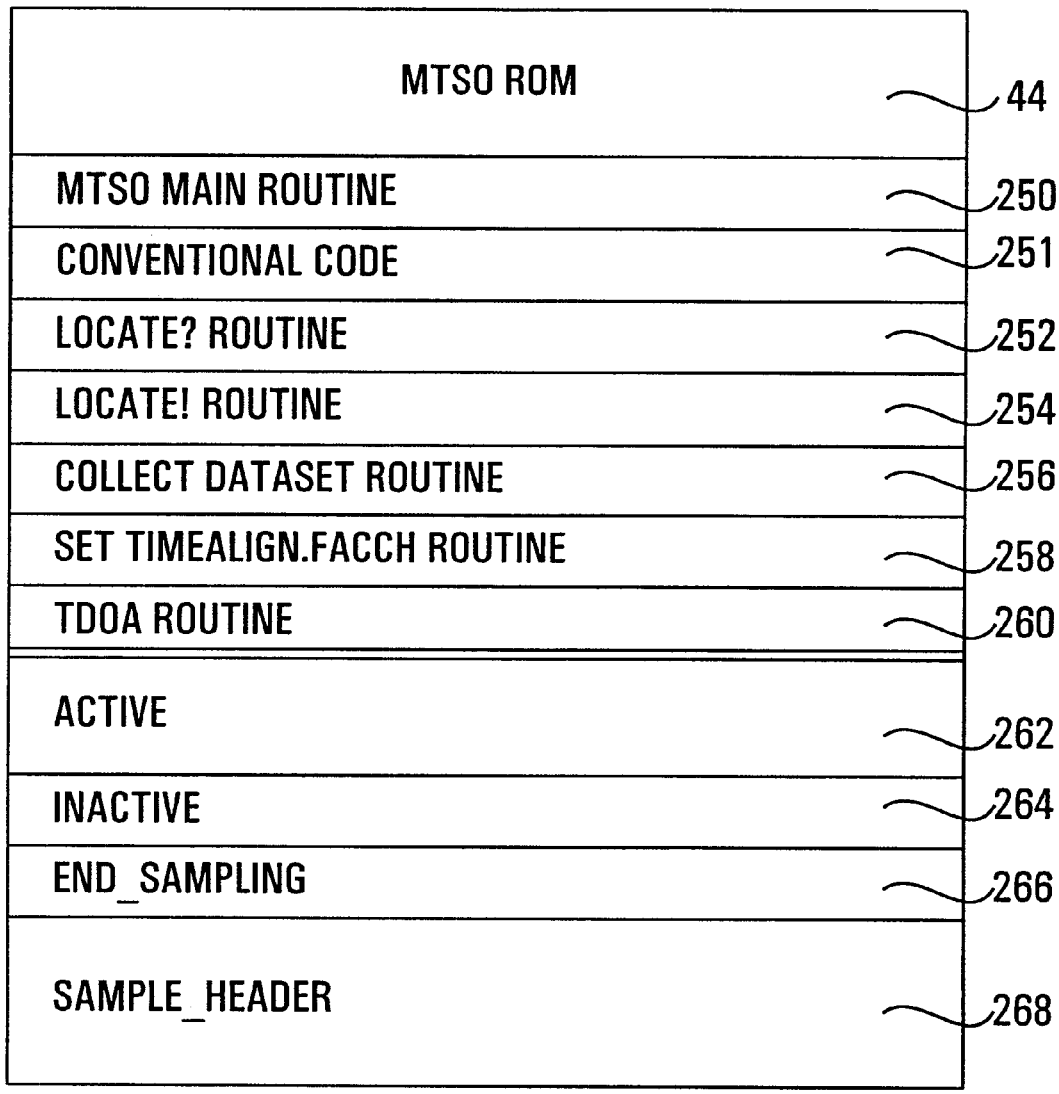
FIG. 6 is a table detailing the allocation of the MTSO ROM of FIG. 2.

FIG. 6 illustrates the allocation of the MTSO ROM 44 in greater detail. The MTSO ROM 44 is programmed with sets of codes readable by the MTSO microprocessor 48 for directing the MTSO microprocessor 48 to interact with the I/O ports to establish certain functionality according to conventional algorithms 251 and according to new algorithms described herein. New algorithms according to this embodiment of the invention are implemented by routines including an MTSO Main Routine 250, a Locate? Routine 252, a Locate! Routine 254, a Collect Dataset Routine 256, a Set Timealign.FACCH Routine 258 and a TDOA routine 260.

Furthermore, the MTSO ROM 44 encodes a set of mnemonic constants, including an ACTIVE constant 262, an INACTIVE constant 264, an END_SAMPLING constant 266, and a SAMPLE_HEADER constant 268.

The mnemonic constant ACTIVE identifies a code representing a digital active state. The mnemonic constant INACTIVE 264 identifies a code representing a digital inactive state. The mnemonic constant END_SAMPLING 226 identifies a code representing a maximum sampling time. The mnemonic constant SAMPLE_HEADER 268 identifies a code representing the header of a data packet storing a sample of signal time of arrival data.

Figure 7:
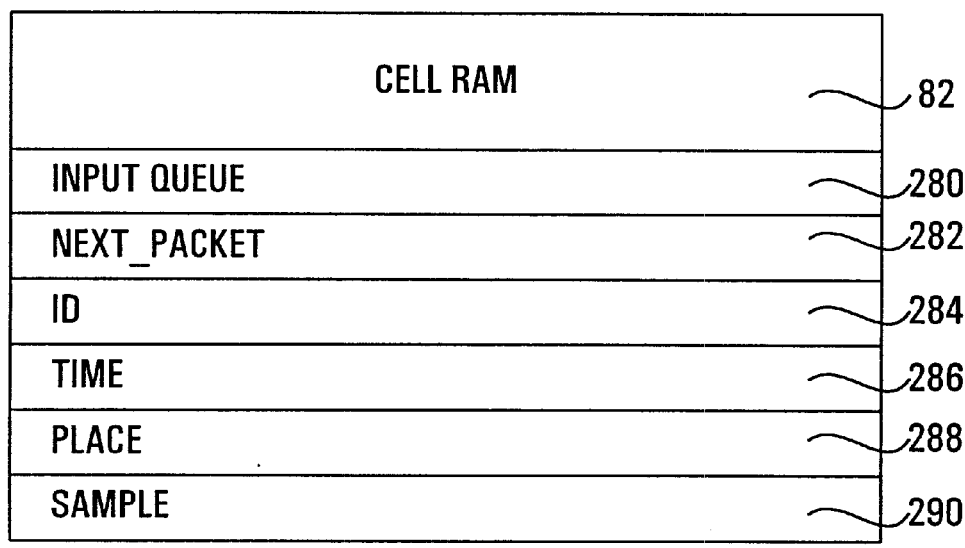
FIG. 7 is a table detailing the allocation of the cell RAM of FIG. 3.

FIG. 7 illustrates the allocation of the cell RAM 82 in greater detail. The cell RAM 82 includes an input queue 280, a next_packet buffer 282, an ID buffer 284, a time buffer 286, a place buffer 288, and a sample buffer 290.

The input queue is loaded with codes representing a data stream received at the cell I/O module from the multi-carrier radio transceiver 96. Associated with the input queue are a read pointer and a write pointer (not illustrated), for respectively indicating the location in the input queue 280 at which the next data is to be read or written.

The next_packet buffer 282 is loaded with codes representing the next data packet read from the input queue 280 at the location indicated by the read pointer.

The ID buffer 284 is loaded with codes representing a predetermined unique identifier associated with each mobile transceiver 18.

The time buffer is loaded with codes representing a time in a format compatible with a global positioning satellite system.

The place buffer 288 is loaded with codes representing a geographic location in a format compatible with a global positioning satellite system.

The sample buffer 290 is loaded with codes representing a time of arrival data sample, and includes codes representing a header identifying the encapsulated data as a sample, an identifier identifying a mobile transceiver 18 associated with the sample in a format corresponding to the ID buffer 284, a sample receipt time in a format corresponding to the time buffer 286, and a sample location in a format corresponding to the place buffer 288.

Figure 8:
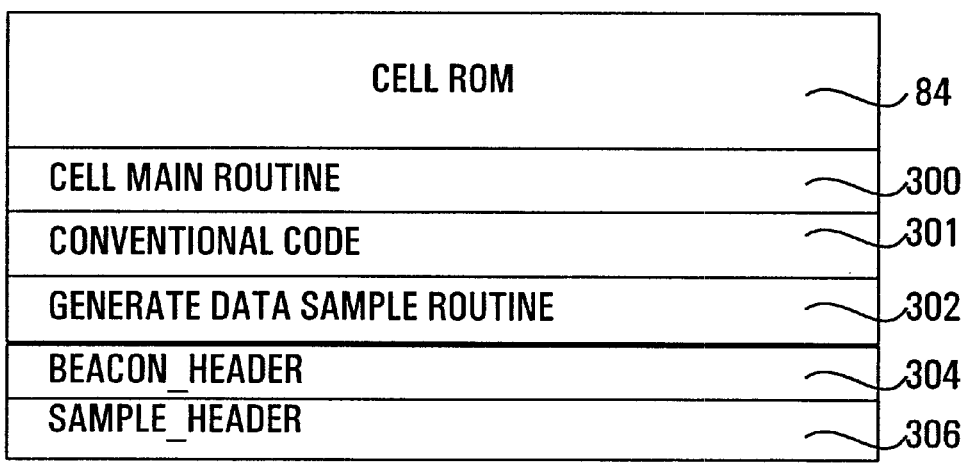
FIG. 8 is a table detailing the allocation of the cell ROM of FIG. 3.

FIG. 8 illustrates the allocation of the cell ROM 84 in greater detail. The cell ROM 84 is programmed with sets of codes readable by the cell microprocessor 88 for directing the cell microprocessor 88 to interact with the I/O ports to establish certain functionality according to conventional algorithms 301 and according to new algorithms described herein. New algorithms according to this embodiment of the invention are implemented by routines including a Cell Main Routine 300 and a Generate Data Sample Routine 302.

The cell. ROM 84 further includes codes representing mnemonic constants, including a mnemonic constant BEACON_HEADER 304 and a mnemonic constant SAMPLE_HEADER 306. The mnemonic constant BEACON_HEADER 304 identifies codes representing the header of a packet associated with a beacon signal (a shortened burst) from a mobile transceiver 18. The mnemonic constant SAMPLE_HEADER 306 identifies codes representing the header of a packet generated at the cell site 14 encapsulating time of arrival data.

Figure 9:
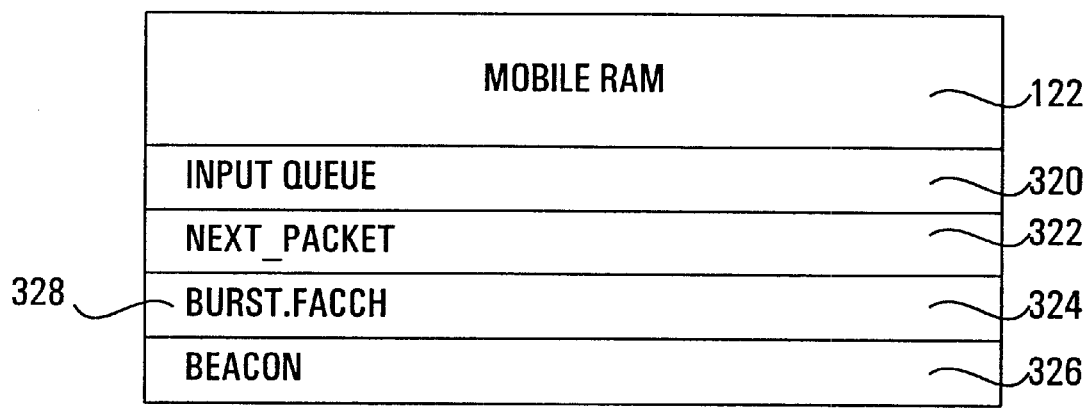
FIG. 9 is a table detailing the allocation of the mobile RAM of FIG. 4.

FIG. 9 illustrates the allocation of the mobile RAM 122 in greater detail. The mobile RAM includes an input queue 320, a next_packet buffer 322, an FACCH array 324, and a beacon buffer 326.

The input queue is loaded with codes representing a data stream received at the mobile I/O module from the wireless telephony module 138. Associated with the input queue 320 are a read pointer and a write pointer (not illustrated), for respectively indicating the location at which the next data is to be read and written.

The next_packet buffer 322 is loaded with codes representing the next data packet read from the input queue 320 at the location indicated by the read pointer.

The FACCH array 324 includes a burst.FACCH element 328. The burst.FACCH element 328 is loaded with codes representing a digital active or digital inactive state indicating whether the mobile transceiver 18 has been commanded to transmit a shortened burst.

The beacon buffer 326 is loaded with codes representing a digital active or digital inactive state indicating whether the mobile transceiver 18 is set to transmit a shortened burst.

Figure 10:
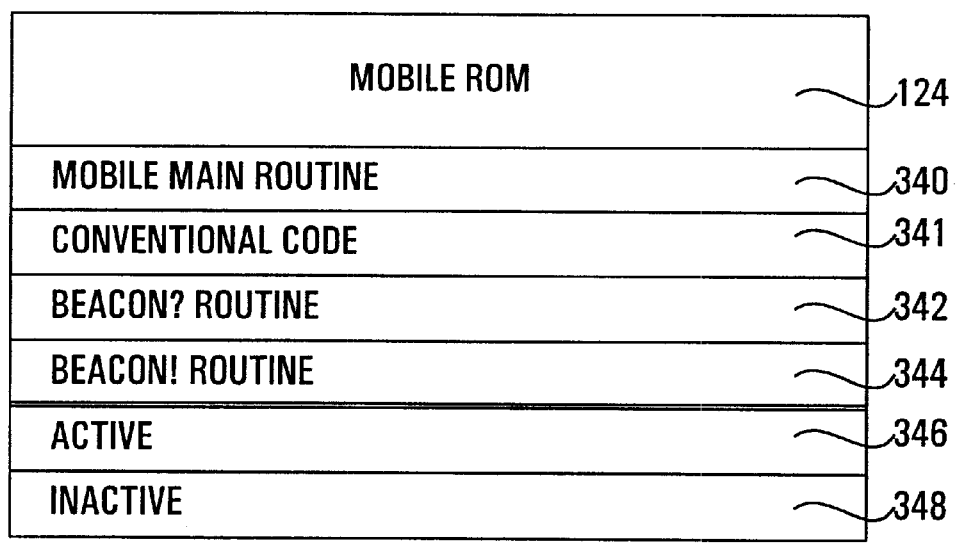
FIG. 10 is a table detailing the allocation of the mobile ROM of FIG. 4.

FIG. 10 illustrates the allocation of the mobile ROM 124 in greater detail. The mobile ROM 124 is programmed with sets of codes readable by the mobile microprocessor 128 for directing the mobile microprocessor 128 to interact with the I/O ports to establish certain functionality according to conventional algorithms 341 and according to new algorithms described herein. New algorithms according to this embodiment of the invention are implemented by routines including a Mobile Main Routine 340, a Beacon? Routine 342, and a Beacon! Routine 344.

The mobile ROM 124 is also programmed with codes representing a mnemonic constant ACTIVE 346 and a mnemonic constant INACTIVE 348. The mnemonic constant ACTIVE 346 identifies codes representing a digital active state. The mnemonic constant INACTIVE 348 identifies codes representing a digital inactive state.

Operation

The operation of this embodiment of the invention will now be described with reference to FIGS. 11 through 19.

Figure 11:
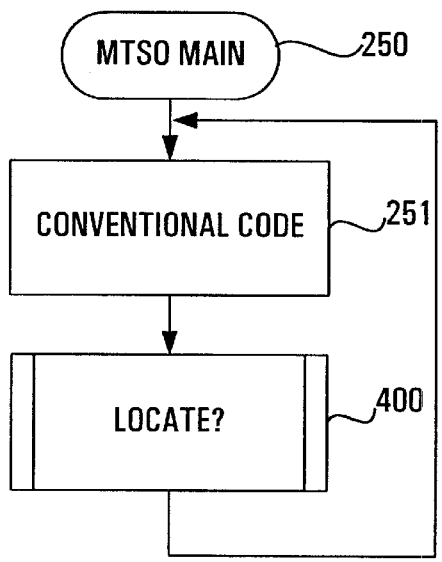
FIG. 11 is a flowchart of an MTSO Main Routine encoded in the MTSO ROM for instructing the MTSO microprocessor.

FIG. 11 illustrates the MTSO Main Routine 250. The MTSO Main Routine begins with a block of conventional code 251 which direct the MTSO microprocessor 48 to perform the functionality conventional to a mobile telephone switching office. Thereafter, block 400 directs the MTSO microprocessor 48 to execute the Locate? Routine 252, whereafter the MTSO microprocessor 48 is directed back to the block of conventional code 251 for further execution.

Figure 12:
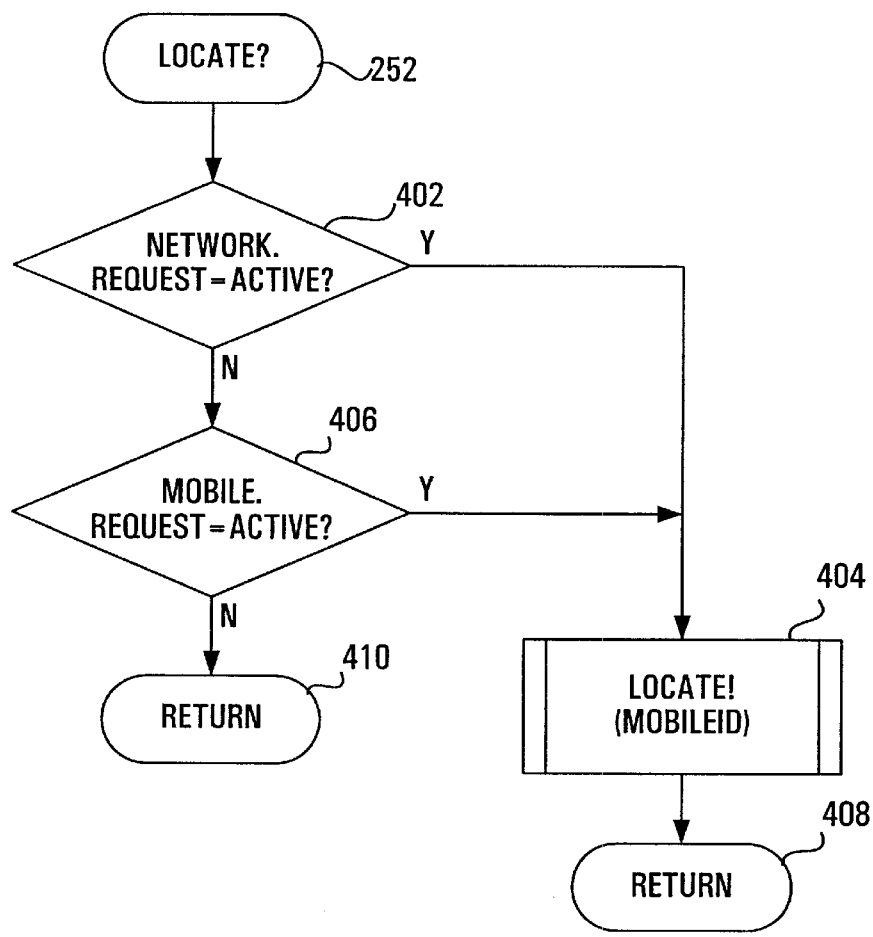
FIG. 12 is a flowchart of a Locate? Routine encoded in the MTSO ROM for instructing the MTSO microprocessor.

FIG. 12 illustrates the Locate? Routine 252. The purpose of the Locate? Routine 252 is to determine whether there exists a request to locate a particular mobile transceiver 18. Such a request might be generated by any node on the mobile telephone system 10, including the mobile transceiver 18 itself. The request would be issued in a conventional signalling manner so as to be interpreted by the MTSO 12 as such a request. Upon detecting such a request, the MTSO microprocessor 48 would be directed to set active the mobile.request element 216 if the request was issued by the mobile transceiver 18 itself or to set active the network.request element 214 if the request were issued by another node on the mobile telephone system 10.

Thus, it will be appreciated that such requests may take a number of forms, and may in fact be incorporated into subscription services offered to mobile transceiver users.

In addition to enhanced 911 service, in which emergency personnel are summoned to the location of the mobile transceiver 18 without the mobile transceiver leaving the conversation state, a mobile transceiver user might subscribe to other services. For example, the user might cause the mobile transceiver 18 to issue an alternative subscription service signal, requesting receipt of an audible or visual indication of location. Such a subscription service would be useful in the event that the user is lost and is trying to describe his location to the party he is conversing with.

Similarly, network-based requests might take a number of forms. For example, police or other security personnel might issue a request to the mobile telephone system 10 to locate a particular mobile transceiver 18. Such a request could be, satisfied without causing the mobile transceiver 18 to leave the conversation state, thus not alerting the mobile transceiver user that the location is being resolved.

Alternatively, a friend or family member of a mobile transceiver user might wish to locate the mobile transceiver 18 and thus the user. In this alternative, the mobile telephone switching office 12 issues a prompt signal to cause the mobile transceiver 18 to prompt its user to determine whether or not he wishes to be located by a party calling from a particular station. Desirably, such prompt signal and calling station information would be encoded within the handoff signal. After parsing and presenting such calling station information as a user-prompt and after receiving a prompt response from the user, the mobile transceiver 18 issues a prompt response signal to either enable or disable the locating process. The prompt response signal either could be a dedicated signal or alternatively could be implied by the presence or absence of the beacon signal in response to the handoff signal.

In greater detail, Block 402 directs the MTSO microprocessor 48 to read the network.request element 214 to determine if its contents are equal to the mnemonic constant ACTIVE 262. If so, then a request has been received from a node on the mobile telephone system 10 to locate a particular mobile transceiver 18 and, as described above, that request is either automatically honored or has been approved by the user of the mobile transceiver 18. Thus block 404 directs the MTSO microprocessor 48 to execute the Locate! Routine 254, passing as a parameter the contents of the mobileID.request element 218 which uniquely identifies the mobile transceiver 18 associated with the locate request. Upon completion of the Locate! Routine 254, block 408 directs the MTSO microprocessor 48 to return to the calling routine.

Alternatively, if at block 402 the contents of the network.request element 214 are not equal to the mnemonic constant. ACTIVE 262, then block 406 directs the MTSO microprocessor 48 to read the mobile.request element 218 to determine if its contents are equal to the mnemonic constant ACTIVE 262. If so, then a particular mobile transceiver 18 has issued a request to be located. For example, in a system compliant with IS-136, this request may take the form of a flash 911 ("*911") signal issued to the MTSO 12.

In this case, the MTSO microprocessor 48 is directed by block 404 to execute the Locate! Routine 254, passing the contents of the mobileID.request element 218 as a parameter. Upon completion of the Locate! Routine 254, block 408 directs the MTSO microprocessor 48 to return to the calling routine.

Alternatively, if at block 406 the contents of the mobile.request element 216 were not equal to the mnemonic constant ACTIVE 262, then the MTSO microprocessor 48 is directed by block 410 to return to the calling routine, as there exists no request to locate a mobile transceiver 18.

Figure 13:
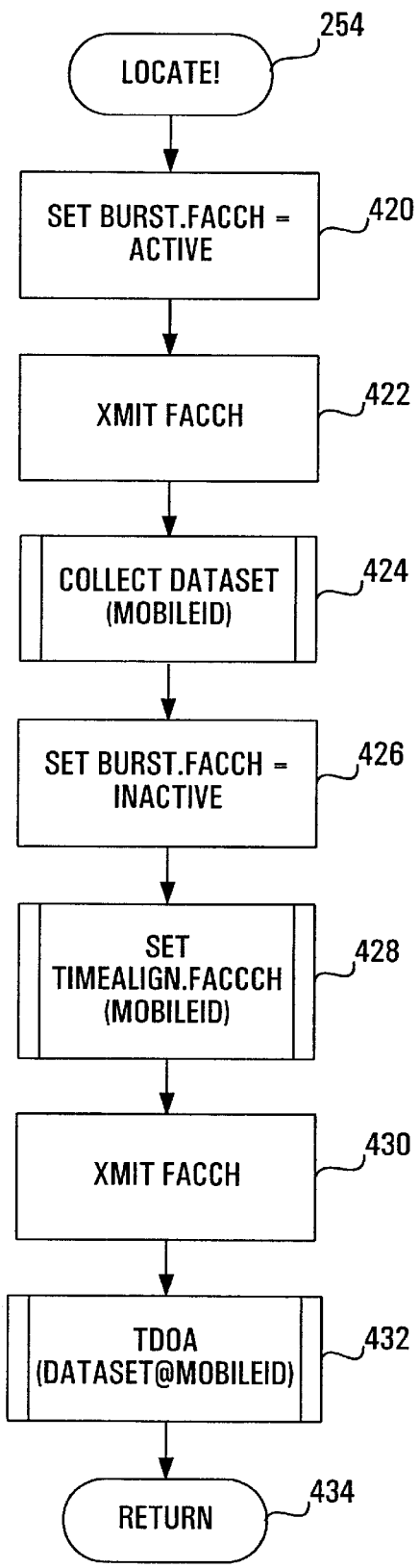
FIG. 13 is a flowchart of a Locate! Routine encoded in the MTSO ROM for instructing the MTSO microprocessor.

FIG. 13 illustrates the Locate! Routine 254. The purpose of the Locate! Routine is to cause the MTSO microprocessor 48 to artificially force the mobile transceiver 18 to commence an intercellular handoff process. The mobile transceiver 18 is forced to issue a shortened burst signal to proximate cell sites 14, ostensibly to determine the time alignment of a next cell site 14 with which it will communicate, but in actuality to generate a dataset of time of arrival samples from each of the proximate cell sites 14 on which to perform time difference of arrival calculations.

Block 420 directs the MTSO microprocessor 48 to store in the burst.FACCH element 220 the mnemonic constant ACTIVE 262. Thereafter, block 422 directs the MTSO microprocessor 48 to transmit the FACCH array 202 to the mobile transceiver 18 identified by the mobileID.request element 218 via the cell site 14 with which the mobile transceiver 18 is currently in communication.

Thereafter, block 424 directs the MTSO microprocessor 48 to execute the Collect Dataset Routine 256, passing as a parameter the contents of the mobileID.request element 218.

Upon completion of the Collect Dataset Routine 256, block 426 directs the MTSO microprocessor 48 to set the burst.FACCH element 220 equal to the contents of the mnemonic constant INACTIVE 264. Thereafter, block 428 directs the MTSO microprocessor 48 to execute the Set Timealign.FACCH Routine 258. This routine is conventional, allocating a time domain multiple access channel to the mobile transceiver 18 that provides it with the best channel characteristics currently available to it in the mobile telephone system 10. Upon completion of the Set Timealign.FACCH Routine 258, block 430 directs the MTSO microprocessor 48 to transmit to the mobile transceiver 18 the FACCH array 202 via the cell site 14 with which the mobile transceiver 18 is currently in communication.

Block 432 then directs the MTSO microprocessor 48 to execute the Time Difference of Arrival (TDOA) Routine 260 to analyze the dataset of time of arrival samples collected to determine the location of the mobile transceiver 18. The TDOA Routine 260 is conventional. Upon completion of the TDOA routine 260, block 434 directs the MTSO microprocessor 48 to return to the calling routine.

Figure 14:
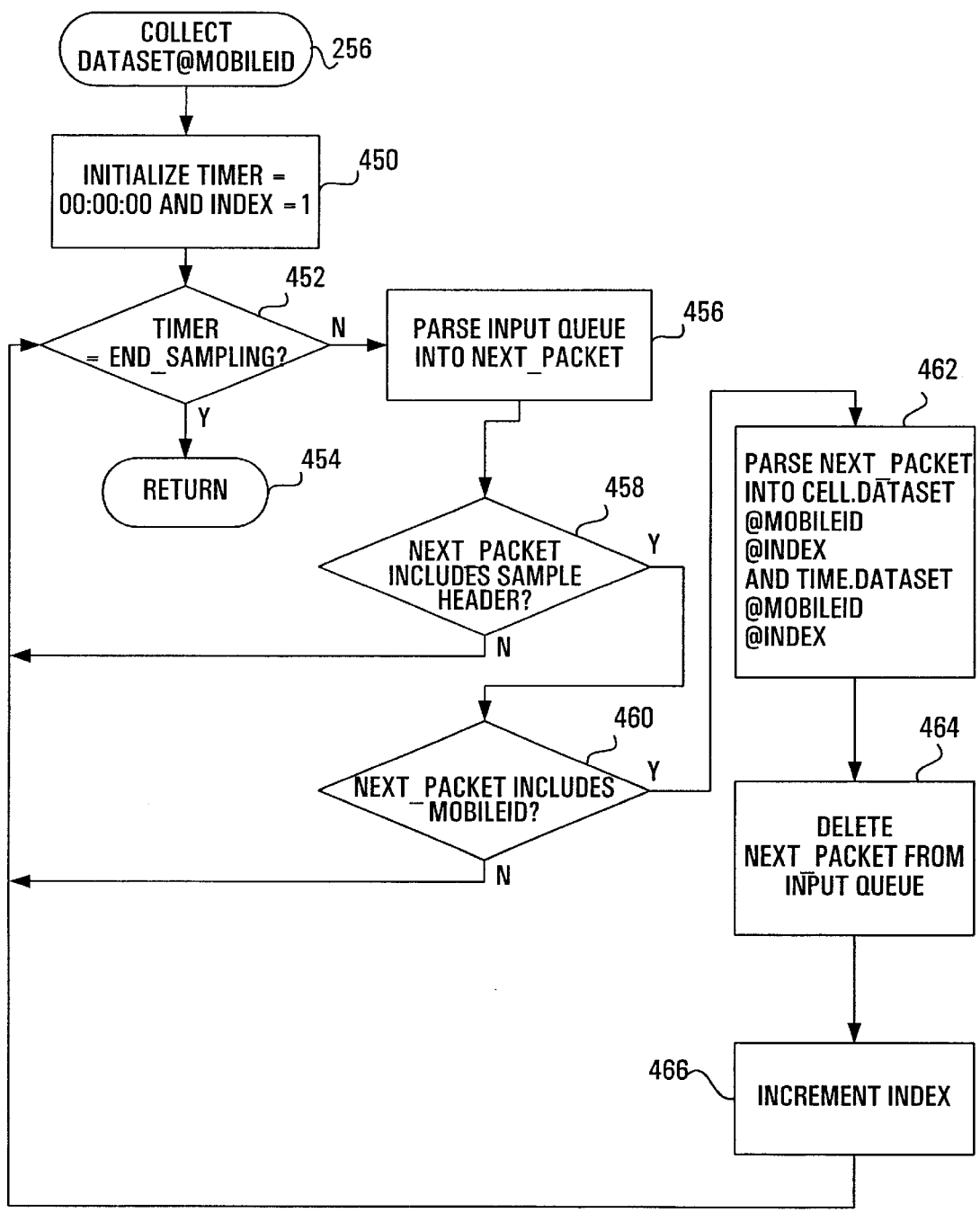
FIG. 14 is a flowchart of a Collect Dataset Routine encoded in the MTSO ROM for instructing the MTSO microprocessor.

FIG. 14 illustrates in greater detail the Collect Dataset Routine 256. The purpose of the collect dataset routine 256 is to cause the MTSO microprocessor 48 to parse the data stream arriving at the MTSO I/O module 50 to extract time of !arrival data samples submitted by cell sites 14 proximate to the mobile transceiver 18 being located.

Block 450 directs the MTSO microprocessor 48 to initialize the timer buffer 204 to zero and to initialize the index buffer 206 to the integer one. Block 452 then directs the MTSO microprocessor 48 to determine whether the contents of the timer buffer are greater than the mnemonic constant END_SAMPLING 266. If so, then block 454 directs the MTSO microprocessor 48 to return to the calling routine, as the sample collecting interval has expired.

Alternatively, if the contents of the timer buffer 204 are not greater than the mnemonic constant END_SAMPLING 266, then block 456 directs the MTSO microprocessor 48 to parse the next packet in the input queue 208 into the next_packet buffer 210.

Block 458 then directs the MTSO microprocessor 48 to determine whether the contents of the next_packet buffer 210 includes the mnemonic constant SAMPLE_HEADER 268. If not, then the MTSO microprocessor 48 is directed back to block 452 to determine whether there is sufficient time to conduct additional sampling.

Alternatively, if the contents of the next_packet buffer 210 includes the mnemonic constant SAMPLE_HEADER 268, then block 460 directs the MTSO microprocessor 48 to determine whether the contents of the next_packet buffer 210 includes the contents of the mobileID.request element 218, thereby identifying the sample as being associated with the mobile transceiver 18 being located. If not, then the MTSO microprocessor 48 is directed back to block 452 to determine whether there exists sufficient time to conduct further sampling.

Alternatively, if the contents of the next_packet buffer 210 includes the contents of the mobileID.request element 218, then block 462 directs the MTSO microprocessor 48 to parse location and time data in the next_packet buffer 210 into the place.dataset element 224 and the time.dataset element 226 of the dataset array 212, setting the contents of the subscript 228 equal to the contents of the index buffer 206. It will be appreciated that the location data for all or some cell sites 14 might be stored at the mobile telephone switching office 12 instead of being received piecemeal in packets from the cell sites 14. Thereafter, block 464 directs the MTSO microprocessor 48 to delete the contents of the next_packet buffer 210 from the input queue 208, adjusting the read and write pointers appropriately. Block 466 then directs the MTSO microprocessor 48 to increment the contents of the index buffer 206, and then block 452 directs the MTSO microprocessor 48 to determine whether there exists sufficient time to conduct further sampling.

Figure 15:
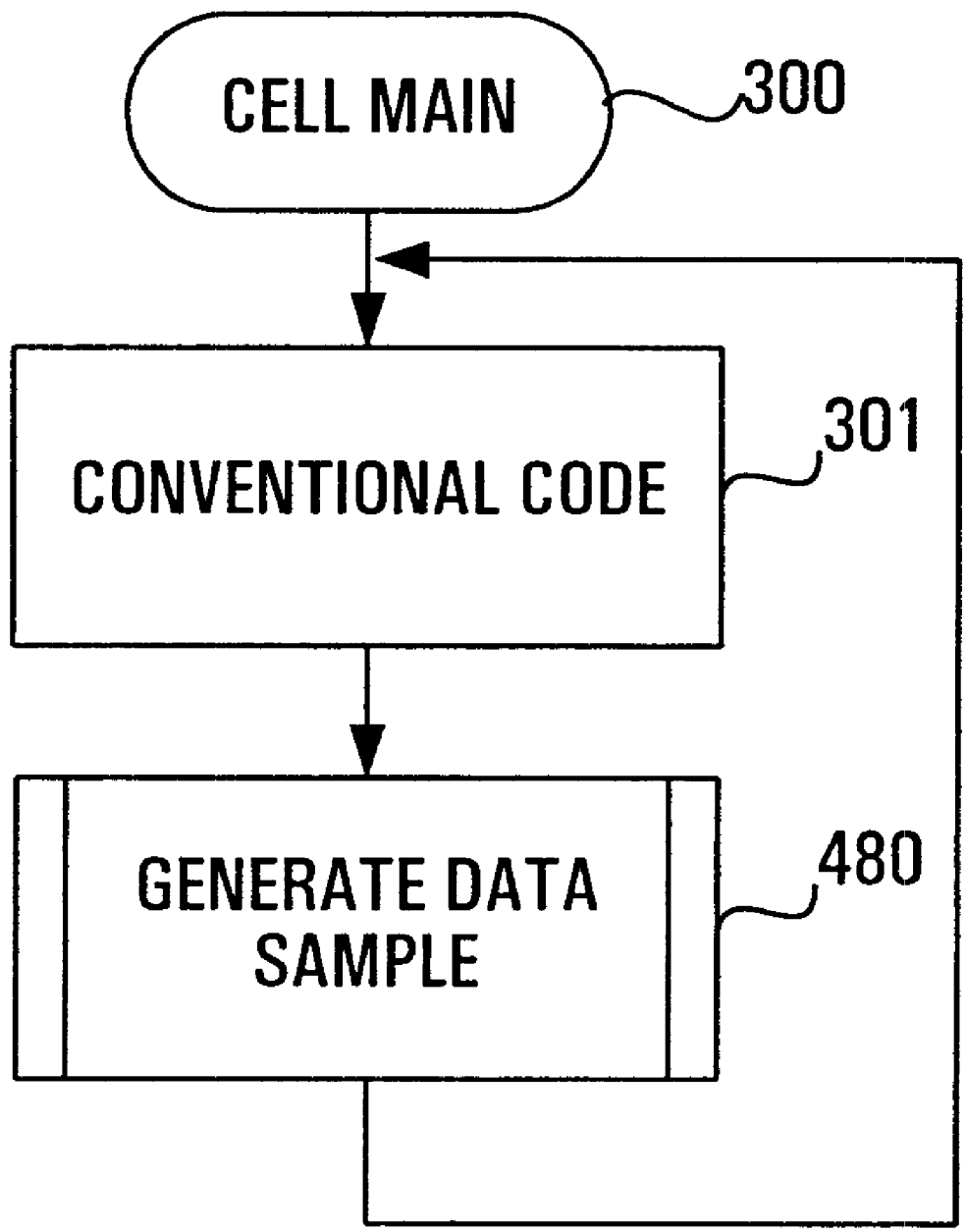
FIG. 15 is a flowchart of a Cell Main Routine encoded in the cell ROM for instructing the cell microprocessor.

FIG. 15 illustrates in greater detail the Cell Main Routine 300. The cell main routine includes conventional code 301 for directing the cell microprocessor 88 to perform the functionality commonly found in a cell site. Thereafter, block 480 directs the cell microprocessor 88 to execute the Generate Data Sample Routine 302, whereafter the cell microprocessor 88 is directed back to block 301 to re-execute the conventional code.

Figure 16:
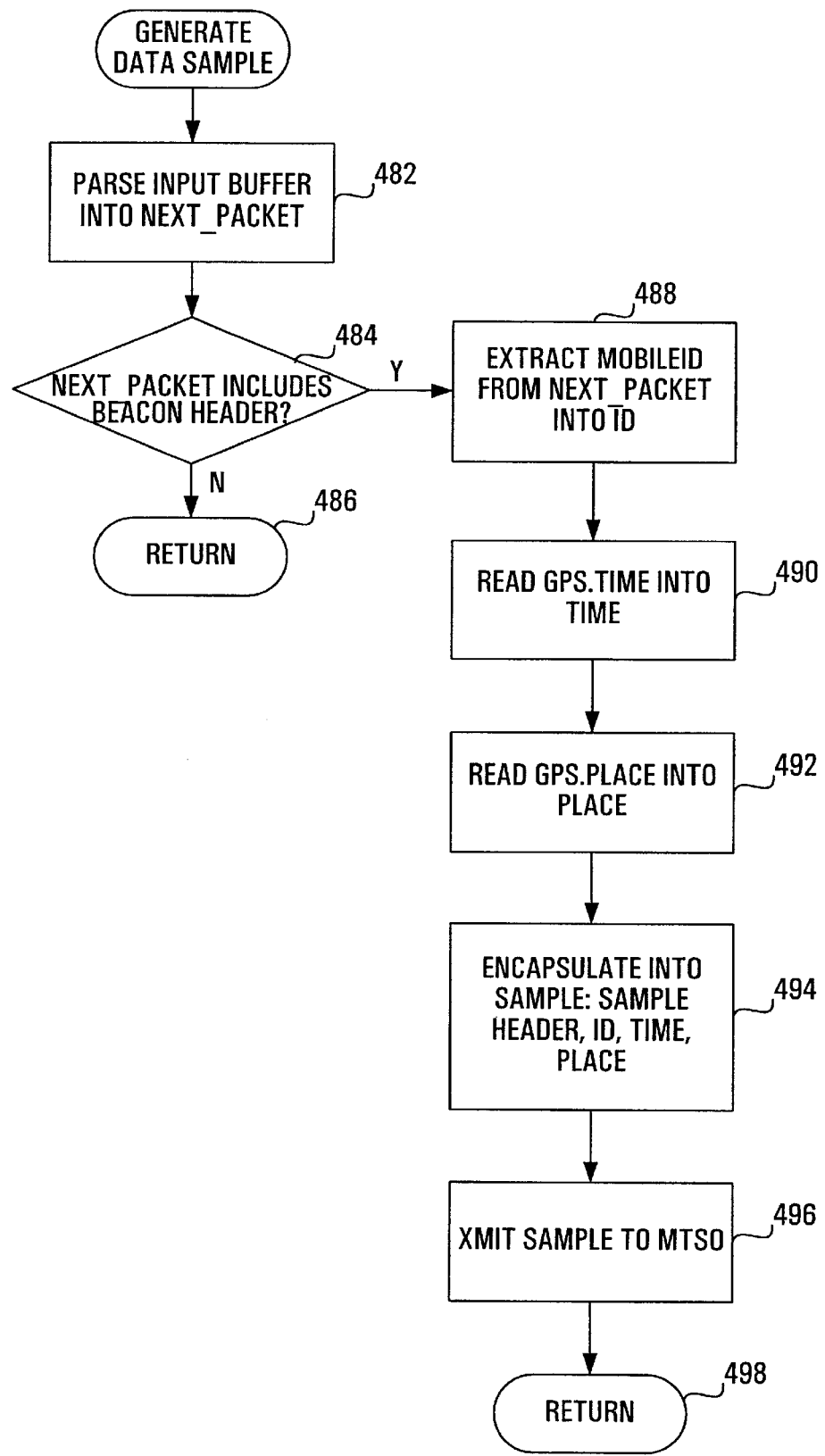
FIG. 16 is a Generate Data Sample Routine encoded in the cell ROM for instructing the cell microprocessor.

FIG. 16 illustrates in greater detail the Generate Data Sample Routine 302. The purpose of the Generate Data Sample Routine 302 is to cause the cell microprocessor 88 to monitor the data stream arriving at the cell I/O module 90 from the multi-carrier radio transceiver 96 to determine when it has received a beacon signal—in this embodiment a shortened burst—from a mobile transceiver 18 and thereupon to create a time of arrival data sample for submission to the MTSO 12.

Block 482 directs the cell microprocessor 88 to parse the next packet in the input queue 280 into the next_packet buffer 282. Thereafter, block 484 directs the cell microprocessor 88 to determine whether the contents of the next_packet buffer 282 includes the mnemonic constant BEACON_HEADER 304. If not, then block 486 directs the cell microprocessor 88 to return to the calling routine, no beacon signal having been received at the cell site 14.

Alternatively, if the contents of the next_packet buffer 282 includes the mnemonic constant BEACON_HEADER 304, then block 4188 directs the cell microprocessor 88 to extract from the next_packet buffer 282 into the ID buffer 284 the predetermined codes uniquely identifying the specific mobile transceiver 18 that is the source of the beacon packet.

Thereafter, block 490 directs the cell microprocessor 88 to read from the GPS port 98 codes representing the current time and to store those codes into the time buffer 286. Similarly, block 492 directs the cell microprocessor 88 to read from the GPS port 98 codes representing the location of the cell site 14 and to store such codes into the place buffer 288. Thereafter, block 494 directs the cell microprocessor 88 to store into the sample buffer 290 the mnemonic constant SAMPLE_HEADER 306, and the respective contents of the ID buffer 284, the time buffer 286, and the place buffer 288.

It will be appreciated that the location data for some or all cell sites 14 may be stored at the mobile telephone switching office 12 instead of being transmitted piecemeal in packets by the cell sites 14. In fact, except in the case of mobile or portable cell sites 14, cell site location data is generally stored at the mobile telephone switching office 12.

Finally, block 496 directs the cell microprocessor 88 to transmit via the trunk 16 the contents of the sample buffer 290 encapsulated into a packet addressed to the MTSO 12. Block 498 then directs the cell microprocessor 88 to return to the calling routine.

Figure 17:
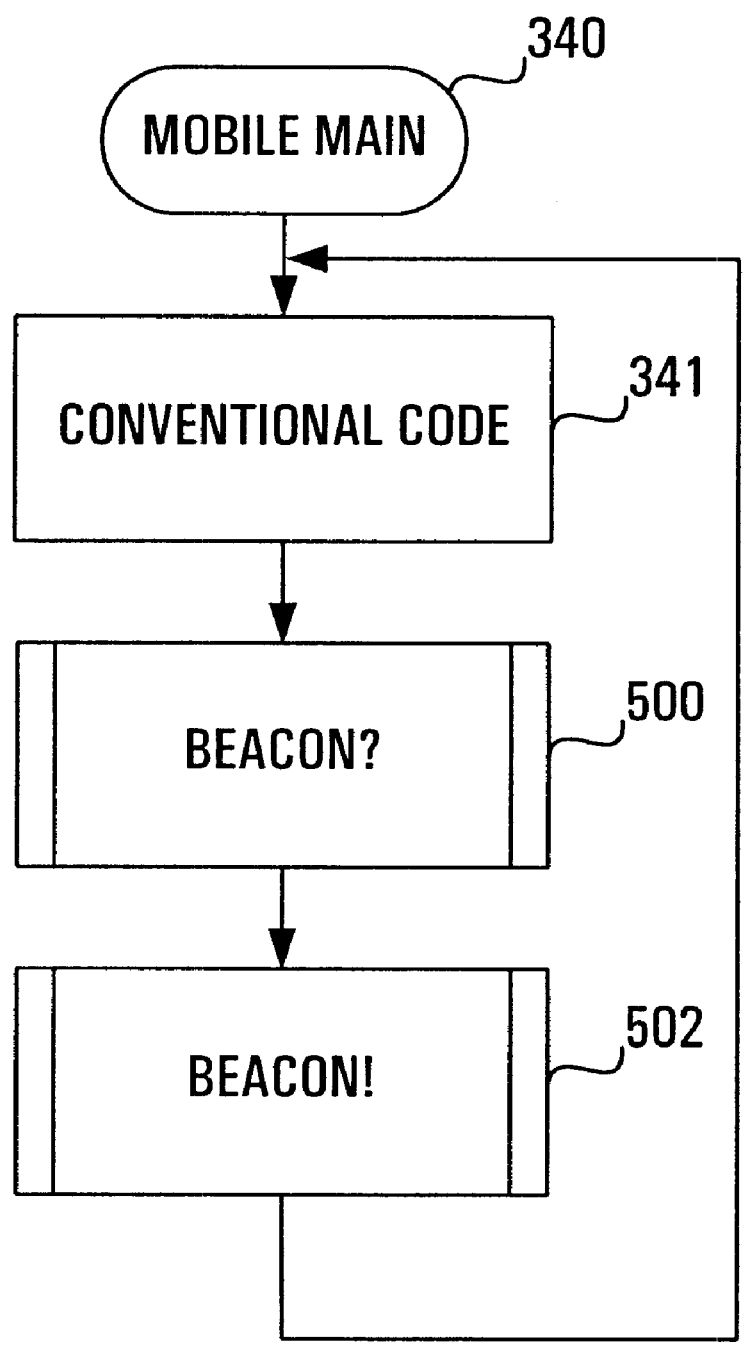
FIG. 17 is a flowchart of a Mobile Main Routine encoded in the mobile ROM for instructing the mobile microprocessor.

FIG. 17 illustrates the Mobile Main Routine 340 in greater detail. Block 341 represents conventional code for directing the mobile microprocessor 128 to implement the functionality conventionally found in a mobile transceiver 18. Thereafter, block 500 directs the mobile microprocessor 128 to execute the. Beacon? Routine 342. Upon completion of the Beacon? Routine 342, block 502 directs the mobile microprocessor 128 to execute the Beacon! Routine 344. Upon completion of the beacon! routine 344, the mobile microprocessor 128 is directed back to block 341 to re-execute the conventional code.

Figure 18:
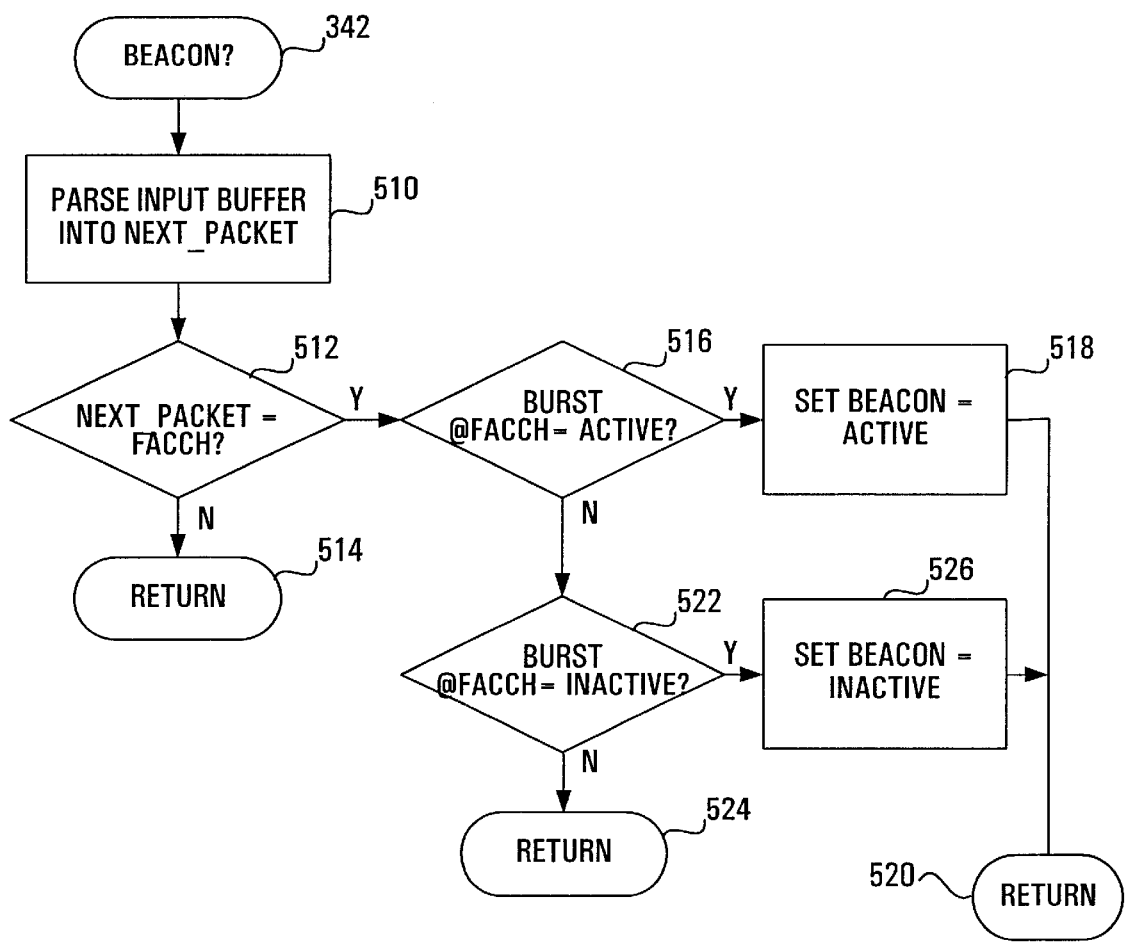
FIG. 18 is a flowchart of a Beacon? Routine encoded in the mobile ROM for instructing the mobile microprocessor.

FIG. 18 illustrates the Beacon? Routine 342 in greater detail. The purpose of the Beacon? Routine 342 is to cause the mobile microprocessor 128 to determine whether it is being commanded by the MTSO 12 to turn on its beacon signal or to turn off its beacon signal.

Block 510 directs the mobile microprocessor 128 to parse the next packet in the input queue 320 into the next_packet buffer 322. Thereafter, block 512 directs the mobile microprocessor 128 to determine whether the contents of the next_packet buffer 322 is an FACCH array 324. If not, then block 514 directs the mobile microprocessor 128 to return to the calling routine.

Alternatively, if the contents of the next_packet buffer 322 includes an FACCH array 324, then block 516 directs the mobile microprocessor 128 to determine whether the contents of the burst.FACCH element 328 are equal to the mnemonic constant ACTIVE 346. If so, then block 518 directs the mobile microprocessor 128 to set the contents of the beacon buffer 326 equal to the mnemonic constant ACTIVE 346. Thereafter, block 520 directs the mobile microprocessor 128 to return to the calling routine.

Alternatively, if at block 516 the contents of the burst-.FACCH element 328 were not equal to the mnemonic constant ACTIVE 346, then block 522 directs the mobile microprocessor 128 to determine whether the contents of the burst.FACCH element 328 is equal to the mnemonic constant INACTIVE 348. If not, then block 524 directs the mobile microprocessor 128 to return to the calling routine.

Alternatively, if the contents of the burst.FACCH element 328 are equal to the mnemonic constant INACTIVE 348, then block 526 directs the mobile microprocessor 128 to set the contents of the beacon buffer 326 equal to the mnemonic constant INACTIVE 348. Thereafter, block 520 directs the mobile microprocessor to return to the calling routine.

Figure 19:
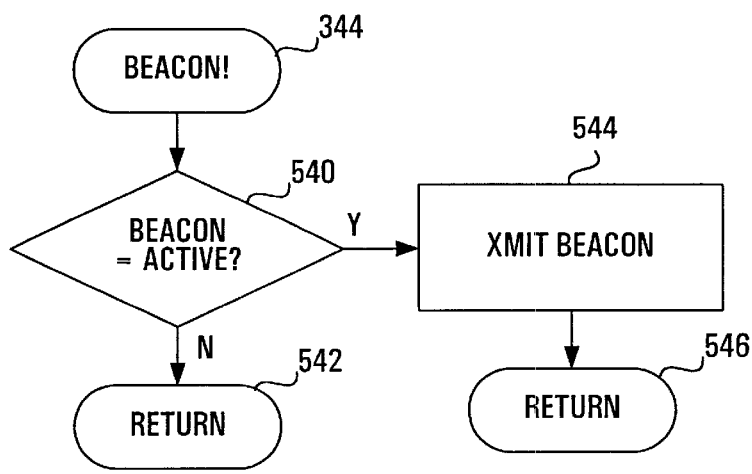
FIG. 19 is a flowchart of a Beacon! Routine encoded in the mobile ROM for instructing the mobile microprocessor.

FIG. 19 illustrates in greater detail the Beacon! Routine 344. The purpose of the Beacon! Routine 344 is to cause the mobile microprocessor 128 to turn on or turn off its beacon signal—in this embodiment a shortened burst—in response to the active or inactive state of the beacon buffer 326. Thus, after the beacon buffer 326 has been loaded with the mnemonic constant ACTIVE 346, the beacon signal will be transmitted continually until the time when the beacon buffer 326 is loaded with the mnemonic constant INACTIVE 348.

Block 540 directs the mobile microprocessor 128 to determine whether the contents of the beacon buffer 326 are equal to the mnemonic constant ACTIVE 346. If not, then block 542 directs mobile microprocessor 128 to return to the calling routine.

Alternatively, if at block 540, the contents of the beacon buffer 326 were equal to the mnemonic constant ACTIVE 346, then block 544 directs the mobile microprocessor 128 to cause a beacon packet to be transmitted from the mobile transceiver 18 via the radio transceiver 150. Thereafter, block 546 directs the mobile microprocessor 128 to return to the calling routine.

Thus it will be seen that aspects of the invention provide a way for a mobile transceiver 18 in a conversation state to continually transmit a beacon signal without leaving the conversation state, the beacon signal being detectable by proximate cell sites 14 and locatable by the MTSO 12 through time difference of arrival calculations performed on time of arrival data submitted by each of the proximate cell sites 14.

Those skilled in the art will appreciate that embodiments of the present invention could extend to a number of cellular technologies, including Time Division Multiple Access (TDMA), Global System for Mobile Communications (GSM), and Code Division Multiple Access (CDMA) technologies.

While very specific embodiments of the invention have been described and illustrated, such embodiments should be considered illustrative of the invention only and not as limiting the invention as construed in accordance with the accompanying claims.

What is claimed is:

1. A method, comprising:
   a) receiving at a mobile telephone switching office a query signal from a network node other than a mobile transceiver;
   b) transmitting from one of a plurality of cell sites to a mobile transceiver a prompt signal for causing the mobile transceiver to indicate that a network node other than the mobile transceiver has issued a query signal;
   c) in response to receipt of the query signal at the mobile telephone switching office, transmitting from one of said plurality of cell sites to the mobile transceiver a handoff signal for causing the mobile transceiver to continually transmit a predetermined beacon signal without leaving a conversation state;
   d) at least some of the plurality of cell sites, receiving the predetermined beacon signal and measuring the time at which the beacon signal was received; and
   e) calculating, at the mobile telephone switching office the location of the mobile transceiver from the respective locations of each of the at least some of the plurality of cell sites and the respective times at which the beacon signal was received at each of the at least some of the plurality of cell sites.

2. A method as claimed in claim 1, wherein the handoff signal is a signal to the mobile transceiver to handoff to a large diameter cell.

3. A method as claimed in claim 2, wherein the handoff signal is a Fast Associated Control Channel Handoff (FACCH) signal.

4. A method as claimed in claim 2, wherein the handoff signal includes a synchronization signal.

5. A method as claimed in claim 1, further including, transmitting from one of the plurality of cell sites to the mobile transceiver a cancel signal for causing the mobile transceiver to stop transmitting the predetermined beacon signal.

6. A method as claimed in claim 5, wherein the cancel signal includes a physical layer control signal.

7. A method as claimed in claim 6, wherein the physical layer control signal includes a time alignment signal.

8. A method as claimed in claim 1, further including suppressing calculating the location of the mobile transceiver pending receipt at the mobile telephone switching office of an affirmative prompt response signal from the mobile transceiver.

9. A method as claimed in claim 1, wherein receiving at the mobile telephone switching office a query signal includes receiving at the mobile telephone switching office a query signal from the mobile transceiver.

10. A method as claimed in claim 9, wherein receiving at the mobile telephone switching office a query signal includes receiving at the mobile telephone switching office a subscription service signal from the mobile transceiver.

11. A method as claimed in claim 9, wherein receiving at the, mobile telephone switching office a query signal includes receiving at the mobile telephone switching office a flash 911 signal.

12. A system, comprising:
   a) a mobile telephone switching office having a receiver for receiving a query signal from a network node other than a mobile transceiver; a processor; and memory storing codes for instructing the processor to calculate a location of a mobile transceiver based upon the respective locations of a plurality of receivers and the respective times that a beacon signal is received at each of the plurality of receivers; and
   b) a plurality of cell sites in communication with the mobile telephone switching office, at least some of the plurality of cell sites each including:
      i) a transmitter rendered active in response to receiving said query signal at said mobile telephone switching office for transmitting to said mobile transceiver a prompt signal for causing said mobile transceiver to indicate that a network node other than said mobile transceiver has issued a query signal and for transmitting to the mobile transceiver a handoff signal for causing the mobile transceiver to continually transmit a predetermined beacon signal without leaving a conversation state;

ii) a receiver acting as a receiver among said plurality of receivers for receiving from the mobile transceiver the predetermined beacon signal continually transmitted from the mobile transceiver;

iii) a clock for measuring the time at which the predetermined beacon signal was received at the receiver; and iv) a communication channel for communicating with the mobile telephone switching office, for communicating the time at which the predetermined beacon signal was received at the receiver.

13. A system as claimed in claim 12, wherein at the at least some of the plurality of cell sites the transmitter is adapted for transmitting to the mobile transceiver a handoff signal for causing the mobile transceiver to handoff to a large diameter cell.

14. A system as claimed in claim 13, wherein at the at least some of the plurality of cell sites the transmitter is adapted for transmitting to the mobile transceiver a Fast Associated Control Channel Handoff (FACCH) signal.

15. A system as claimed in claim 14, wherein at the at least some of the plurality of cell sites the transmitter is adapted for transmitting to the mobile transceiver a handoff signal including a synchronization signal.

16. A system as claimed in claim 12, wherein at the at least some of the plurality of cell sites the transmitter is adapted for transmitting to the mobile transceiver a cancel signal for causing the mobile transceiver to stop transmitting the predetermined beacon signal.

17. A system as claimed in claim 16, wherein at the at least some of the plurality of cell sites the transmitter is adapted for transmitting to the mobile transceiver a cancel signal including a physical layer control signal.

18. A system as claimed in claim 17, wherein at the at least some of the plurality of cell sites the transmitter is adapted for transmitting to the mobile transceiver a physical layer control signal including a time alignment signal.

19. A system as claimed in claim 12, wherein:

a) at the at least some of the plurality of cell sites the receiver is adapted for receiving from the mobile transceiver a predetermined affirmative prompt response signal; and b) the codes stored in the memory at the mobile telephone switching office include codes for instructing the processor to calculate a location of a mobile transceiver only when the predetermined affirmative prompt response signal has been received at the receiver at the at least some of the plurality of cell sites.

20. A system as claimed in claim 12, wherein at the at least some of the plurality of cell sites the transmitter is rendered active for transmitting to the mobile transceiver the handoff signal in response to the second receiver receiving the query signal from the mobile transceiver.

21. A system as claimed in claim 20, wherein at the at least some of the plurality of cell sites the transmitter is rendered active for transmitting to the mobile transceiver the handoff signal in response to the second receiver receiving the query signal from the mobile transceiver, the query signal including a subscription service signal.

22. A system as claimed in claim 20, wherein at the at least some of the plurality of cell sites the transmitter is rendered active for transmitting to the mobile transceiver the handoff signal in response to the second receiver receiving the query signal from the mobile transceiver, the query signal including a flash 911 signal.

23. A method comprising:

a) receiving at a mobile transceiver from one of a plurality of cell sites a handoff signal for causing the mobile transceiver to continually transmit a predetermined beacon signal without leaving a conversation state;

b) transmitting to at least some of the plurality of cell sites, the predetermined beacon signal for time difference of arrival calculation;

c) receiving at the mobile transceiver from one of the plurality of cell sites a prompt signal indicating that a network node other than the mobile transceiver has generated a query signal querying the location of the mobile transceiver; and d) prompting a user at the mobile transceiver that the network node other than the mobile transceiver has generated the query signal.

24. A method as claimed in claim 23, wherein the handoff signal is a signal for causing the mobile transceiver to handoff to a large diameter cell.

25. A method as claimed in claim 24 wherein the handoff signal is a Fast Associated Control Channel Handoff (FACCH) signal.

26. A method as claimed in claim 25, wherein the handoff signal includes a synchronization signal.

27. A method as claimed in claim 23, further including receiving at the mobile transceiver from one of the plurality of cell sites a cancel signal for causing the mobile transceiver to stop transmitting the predetermined beacon signal.

28. A method as claimed in claim 27, wherein the cancel signal includes a physical layer control signal.

29. A method as claimed in claim 28, wherein the physical layer control signal includes a time alignment signal.

30. A method as claimed in claim 23:

a) further including transmitting from the mobile transceiver to one of the plurality of cell sites a query signal; and b) wherein receiving at the mobile transceiver the handoff signal from one of the plurality of cell sites is in response to transmitting the query signal.

31. A method as claimed in claim 30, wherein transmitting from the mobile transceiver to one of the plurality of cell sites a query signal includes transmitting from the mobile transceiver to one of the plurality of cell sites a subscription service signal.

32. A method as claimed in claim 30, wherein transmitting from the mobile transceiver to one of the plurality of cell sites a query signal includes transmitting from the mobile transceiver to one of the plurality of cell sites a flash 911 signal.

33. A method as claimed in claim 23, further including:

a) receiving at the mobile transceiver a user-initiated-input after prompting the user at the mobile transceiver that the network node other than the mobile transceiver has generated the query signal; and b) transmitting from the mobile transceiver to one of the plurality of cell sites a prompt response signal corresponding to the user-initiated-input.

34. A cellular mobile transceiver apparatus locatable in a conversation state with respect to a plurality of cell sites, comprising:

a) a receiver for receiving from at least one of the plurality of cell sites a handoff signal for causing the mobile transceiver to continually transmit a predetermined beacon signal while still in the conversation state, the receiver being adapted for receiving from one of the plurality of cell sites a prompt signal indicating that a network node other than the mobile transceiver has generated a query signal querying the location of the mobile transceiver; and b) a transmitter for transmitting the predetermined beacon signal to at least some of the plurality of cell sites for time difference of arrival calculation in response to the handoff signal being received at the receiver, the transmitter being adapted for transmitting to one of the plurality of cell sites a prompt response signal corresponding to a decision by a mobile transceiver user whether to permit location of the mobile transceiver.

35. An apparatus as claimed in claim 34, wherein the receiver is adapted for receiving a handoff signal for causing the mobile transceiver to handoff to a large diameter cell.

36. An apparatus as claimed in claim 35, wherein the receiver is adapted for receiving a Fast Associated Control Channel Handoff (FACCH) signal.

37. An apparatus as claimed in claim 36, wherein the receiver is adapted for receiving a handoff signal including a synchronization signal.

38. An apparatus as claimed in claim 34, wherein the receiver is adapted for receiving a cancel signal for causing the mobile transceiver to stop transmitting the predetermined beacon signal.

39. An apparatus as claimed in claim 38, wherein the receiver is adapted for receiving a cancel signal including a physical layer control signal.

40. An apparatus as claimed in claim 39, wherein the receiver is adapted for receiving a physical layer control signal including a time alignment signal.

41. An apparatus as claimed in claim 34, wherein the transmitter is adapted for transmitting a query signal to at least some of the plurality of cell sites to trigger the handoff signal.

42. An apparatus as claimed in claim 41, wherein the transmitter is adapted for transmitting a query signal including a subscription service signal.

43. An apparatus as claimed in claim 41, wherein the transmitter is adapted for transmitting a query signal including a flash 911 signal.

* * * * *